United States Patent [19]

Stroppiana et al.

[11] Patent Number: 5,006,930
[45] Date of Patent: Apr. 9, 1991

[54] DEVICE FOR REDUCING THE REDUNDANCY IN BLOCKS OF DIGITAL VIDEO DATA IN DCT ENCODING

[75] Inventors: Mario Stroppiana, Turin; Luigi Ronchetti, Como, both of Italy

[73] Assignee: RAI Radiotelevisions Italiano, S.p.A., Italy

[21] Appl. No.: 489,485

[22] Filed: Mar. 6, 1990

[30] Foreign Application Priority Data

Jul. 4, 1989 [EP] European Pat. Off. ........ 89830311.0

[51] Int. Cl.$^5$ .............................................. H04N 7/13
[52] U.S. Cl. .................................. 358/133; 358/136; 341/200
[58] Field of Search ....................... 358/133, 135, 136; 341/200; 364/725

[56] References Cited

U.S. PATENT DOCUMENTS 4,743,967 5/1988 Takenaka et al. ............... 358/133 X
4,802,004 1/1989 Matsumoto et al. ................ 358/135
4,875,095 10/1989 Matsumoto et al. ............ 358/135 X

FOREIGN PATENT DOCUMENTS 0258530 11/1987 Japan .................................. 341/200

Primary Examiner—Victor R. Kostak
Attorney, Agent, or Firm—R. Neil Sudol; Henry D. Coleman

[57] ABSTRACT

A converter processes a digital video signal according to a known redundancy reducing algorithm executed on successive block for each frame or field and generates a transformed signal which is applied to a quantizer adapted to generate a quantized signal at preset transition levels on opposed sides of the zero, including the zero ( . . . , −3, −2, −1, 0, 1, 2, 3, . . . ). The quantized signal is processed by a processor, adapted to determine the block length and the consecutive zero sequences along a preset scanning order, and to output a symbolic signal constituted by symbols indicating the quantization levels of the non-null data, the zero sequences and a symbol indicating the block end. The symbolic signal is applied to a variable length VLC encoder, adapted to encode data according to a preset designation law for generating a signal which is applied to a transmission buffer. The quantized signal generated by the quantizer further includes two ambiguous levels (x1 and x−1) at input values falling within respective preset intermediate ranges respectively between the zero level and the first positive level and between the zero level and the first negative level; the processor transforms each of the ambiguous levels respectively into a first positive level and a first negative level if the preceding and subsequent input values are both non-null and non-ambiguous, and transforms the ambiguous level into zero in all other cases.

6 Claims, 2 Drawing Sheets

DEVICE FOR REDUCING THE REDUNDANCY IN BLOCKS OF DIGITAL VIDEO DATA IN DCT ENCODING

BACKGROUND OF THE INVENTION

The present invention relates to an improved device for DCT encoding, quantization and variable word length encoding of digital video signals with a reduction of redundancy of the same video signals.

As it is known, into the DCT encoding (Discrete Cosine Transform) of digital video signals, the video data of each frame or field of the video signal are divided in blocks of, for example, 8×8 pel, and the data of each block are treated with a conversion algorithm (Discrete Cosine Transform) that reduces the correlation inside each block. In the more advanced types, the conversion algorithm, in order to reduce the global correlation even more, takes into account one or more preceding frames or fields to draw a prediction. In any case the transformed data are subsequently quantized, scanned according a preset scanning track, and encoded with variable-length words according to an assignment table in which shorter codes are assigned to more frequently occurring data and, since uninterrupted sequences of zeroes are very frequent, specific codes are assigned for zero sequences of different lengths. For a more detailed description of these techniques see, for example, Rafael C. Gonzales and Paul Wintz, "Digital Signal Processing", 2nd edition, Addison Wesley, pages 288–289.

As it is known, the essential aim of the above-cited techniques is that of reducing the mean volume of digital video signals to be transmitted in a transmission channel, for the same definition of the transmitted image. However, such signal processing techniques yield a time-variable data flow, namely greater for complex or rapidly moving images and lower for static and/or scarcely detailed images. In order to prevent the occasional saturation of the channel because of that, the quantization resolution is reduced as the generated data flow grows.

SUMMARY OF THE INVENTION

An object of the invention is to improve the above-described encoding system for further reducing the average number of bits to be transmitted, with the same information content of the original video signal, in order to obtain a higher image quality in transmitting digital video signals in a given transmission channel.

Considering that the encoded and transmitted signals will be decoded by the receiver, the invention aims at reducing the transmitted bits without having either to modify the decoder or to give it supplementary information.

The invention achieves the above mentioned aim, as well as other aims and advantages as will be apparent from the following description, with an improved device for DCT encoding, quantization and variable word length encoding of digital video signals with a reduction of redundancy of the video signal, comprising a converter which processes a digital video signal, according to a redundancy reducing algorithm operating on successive blocks of each frame or field, generating a transformed signal which is applied to a quantizer adapted to generate a quantized signal at preset transition levels on opposite sides of zero, including the zero ($\ldots$, $-3$, $-2$, $-1$, 0, 1, 2, 3, $\ldots$), which quantized signal is processed by a processor adapted to determine the block length and the consecutive zero sequences along a preset scanning order, and adapted to output a symbolic signal, constituted by symbols designating the quantization levels of the non-null data, the zero sequences and a symbol designating the end of the block, the symbolic signal being applied to a variable-length encoder, adapted to encode data according to a preset assignment rule for generating a signal which is applied to a transmission buffer; said quantized signal generated by the quantizer further comprising two ambiguous levels (x1 and x−1) at input values comprised in respective preset intermediate ranges respectively between the zero level and the first positive level and between the zero level and the first negative level, said processor transforming each of said ambiguous levels respectively in a first positive level and a first negative level if the preceding and subsequent input values are both non-null and non-ambiguous levels, and transforms the ambiguous level in zero level in all the other cases.

BRIEF DESCRIPTION OF THE DRAWINGS

The invention will be described now in more detail with reference to some of its preferred embodiments, represented in the enclosed drawings, given as non limitative examples, in which.

DETAILED DESCRIPTION OF THE PREFERRED EMBODIMENTS

Figure 1:
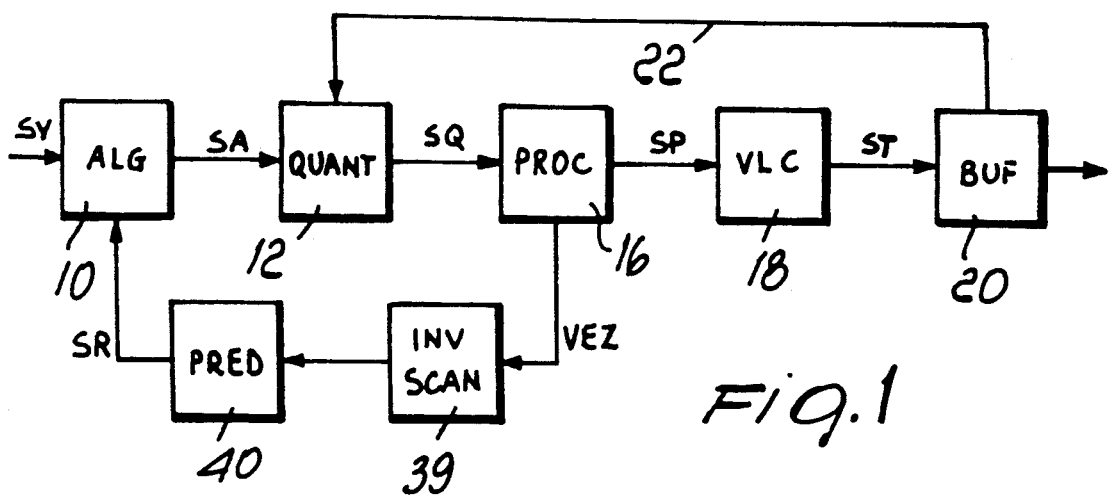
FIG. 1 is a block diagram of a device according to a first preferred embodiment of the invention.

With reference to FIG. 1, the device, according to a first embodiment of the invention, comprises a converter 10 which processes a digital video signal (SV) according to a known algorithm for reducing the redundancy as the Discrete Cosine Transform (DCT), executed on successive blocks of each frame or field, generating a transformed signal SA which is applied to a quantizer 12. The quantizer 12 generates a quantized data flow SQ, processed by a processor 16, having the task of determining the block length and the consecutive zero sequences along a preset scanning order, and of giving an output signal SP, constituted by symbols designating the quantization levels of the non null data ($\ldots$, $-3$, $-2$, $-1$, 1, 2, 3, $\ldots$), the zero sequences (Z1, Z2, Z3, Z4, $\ldots$) and a symbol designating the end of the block (EOB0, EOB1). Finally, signal SP is applied to a variable-length VLC encoder 18, which encodes data according to an assignment rule of which a partial example is illustrated in Table I. The digital signal ST generated by the encoder 18 is eventually applied to a transmission buffer 20, from which data are read out at a constant rate for transmission. As schematically indicated by line 22, buffer 20 varies the quantization resolution of quantizer 12, making the quantization rougher as the buffer fills up.

The converter 10, the quantizer 12 and the encoder 18 and their operating modes are known (see for example the above-mentioned work by Gonzales and Wintz)

and will not be further described but for the aspects directly involving the present invention.

TABLE I

| Symbol | code word | bit number |
|---|---|---|
| Z10 | 10 11 10 01 | 8 |
| Z8 | 10 11 11 00 | 8 |
| Z6 | 10 11 11 01 | 8 |
| −4 | 10 10 00 | 6 |
| −3 | 10 10 01 | 6 |
| EOB0 | 10 11 00 | 6 |
| Z4 | 10 11 01 | 6 |
| Z2 | 10 00 | 4 |
| −2 | 10 01 | 4 |
| −1 | 00 | 2 |
| 1 | 01 | 2 |
| 2 | 11 00 | 4 |
| Z1 | 11 01 | 4 |
| Z3 | 11 10 00 | 6 |
| EOB1 | 11 10 01 | 6 |
| 3 | 11 11 00 | 6 |
| 4 | 11 11 01 | 6 |
| Z5 | 11 10 10 00 | 8 |
| Z7 | 11 10 10 01 | 8 |
| Z9 | 11 10 11 00 | 8 |

In Table I, Zn are symbols designating n zero sequences and EOBi are block end symbols.

Figure 2:
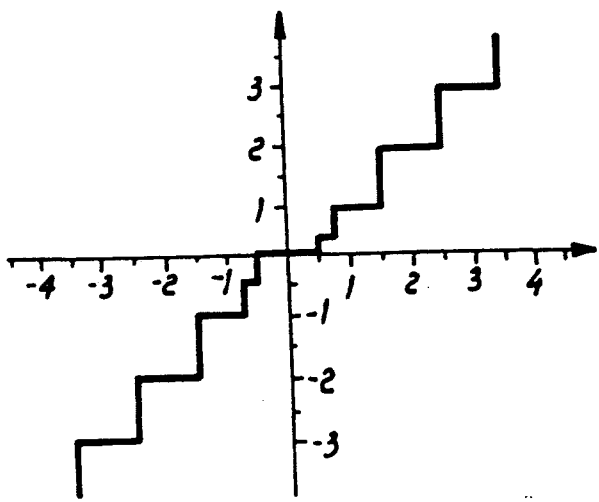
FIG. 2 is a graph showing the quantization of a quantizer which is part of the device of FIG. 1.

The graph of FIG. 2 shows the quantization law followed by the quantizer 12 for generating the quantized signal SQ. Generally, the quantizer provides a single (normalized) output level for a range of input values symmetrically lying above and under such level, for example: level 3, for the range between 2.5 and 3.5; level 4 for the range between 3.5 and 4.5; and the output level 0 is therefore generated for the input range between −0.5 and +0.5.

However, according to the invention, the quantizer is also capable of generating two ambiguous levels, x1 and x−1, at input signals comprised respectively in the range between +0.5 and (0.5+k), and in the range between −(0.5+k) and −0.5, with k=*0.25, i.e. in limited ranges close to the zero interval and comprised in the intervals which would belong respectively to level +1 and level −1, according to the known art. The k value, indicated by way of example, may be alternatively smaller or larger, in general greater than 0 and lesser than 1.

The DCT encoding and the subsequent quantization (together with the above-mentioned prediction technique) tend to generate many small values (−1, 1, −2, 2), and especially many zeroes, often in uninterrupted sequences, particularly in the static or low detailed image blocks. Table I shows how the code-assignment rule reflects this situation. Level +2 requires more bits than level +1, level +3 requires more bits than level +2, etc. The zeroes are especially privileged: a sequence of, for example, six zeroes requires 8 bits compared with the 12 bit sequence required for transmitting a sequence of six consecutive ones. In addition to the above-mentioned known operations, the processor 16, according to the invention, has also the task of setting the transformation of each of said ambiguous levels x1 and x−1, either in a zero level or respectively in a first positive level (1) and a first negative level (−1), in order to minimize the number of bits in the data flow fed to the buffer 20 and to the following transmission channel. By way of example, in case an ambiguous level x1 falls within a sequence of three zeroes Z3 and a sequence of two zeroes Z2 (i.e. Z3 x1 Z2), the transformation of x1 in 1 would provide a VLC encoding of 6+2+4=12 bits (see Table I), while the transformation of x1 into 0 would provide a single sequence of six zeroes Z6, encoded with just 8 bits. Therefore, in this case, processor 16 will provide the transformation of x1 into 0.

Figure 3:
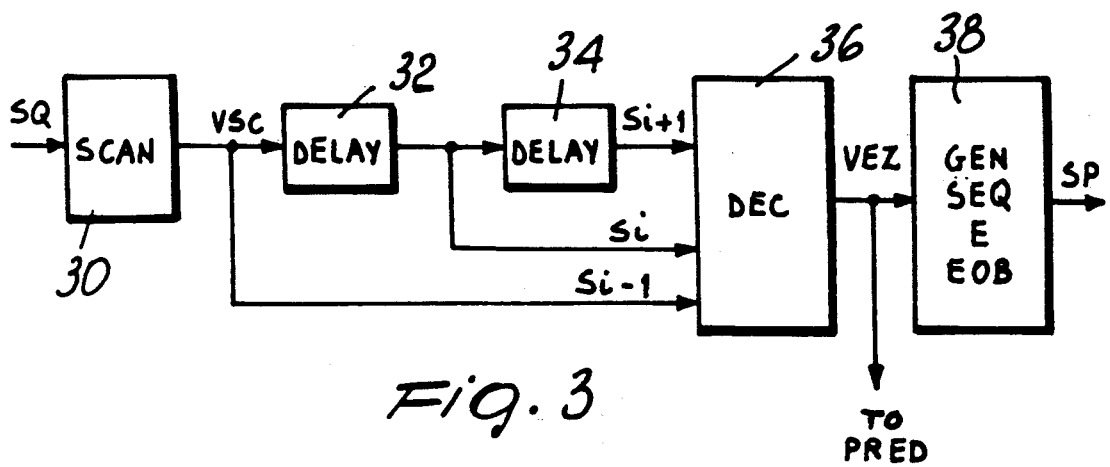
FIG. 3 is a block diagram of a processor which is part of the device of FIG. 1.

In other cases, in which the reduction of the ambiguous level to 0 does not provide a saving of bits, the ambiguous level will naturally have to be confirmed at 1 (or −1). By analyzing the various situations, it comes out that it is always convenient to set the ambiguous level to zero, except when the ambiguous level is preceded and at the same time followed by non-null and non-ambiguous levels. Such function is implemented by forming the processor as illustrated in FIG. 3. A per se known scanner module 30 receives the quantized signal blocks SQ and executes the scanning (generally diagonal), converting the block into a vector VSC, which is applied to a first and a second delay circuits 32 and 34, for giving three versions of that vector, $Si-1$, $Si$, $Si+1$, respectively delayed by zero, one and two periods. The three versions $Si-1$, $Si$, $Si+1$, are applied to the three inputs of a decision module 36, adapted to convert each ambiguous level to 0 or 1 as the case may be. The output vector VEZ of the decision module 36 is applied to a module 11 generating zero sequences and block end symbols, the output vector VEZ being the signal SP applied to the VLC encoder 18 of FIG. 1. The decision module 36 is a combinatorial circuit providing the truth table shown in Table II, where N is any value greater or equal to 1, and Q indicates that the value is indifferent (0 or N). For simplicity, Table II has been limited to the positive ambiguous levels x1: the table can be easily extended to negative ambiguous levels x−1, by using the same criteria.

TABLE II

| $Si - 1$ | $Si$ | $Si + 1$ | U |
|---|---|---|---|
| Q | 0 | Q | 0 |
| Q | 1 | Q | 1 |
| 0 | x1 | 0 | 0 |
| 0 | x1 | N | 0 |
| 0 | x1 | x1 | 0 |
| N | x1 | 0 | 0 |
| N | x1 | N | 1 |
| N | x1 | x1 | 0 |
| x1 | x1 | 0 | 0 |
| x1 | x1 | N | 0 |
| x1 | x1 | x1 | 0 |

It is easy to provide a decision module for implementing Table II by means of computing techniques very well known in the field of circuit logic. Therefore it will not be described.

The signal VEZ, generated by the decision module 36, is applied also to an inverse scanning module 39 which regenerates a block signal which is in turn applied to a per se known predictor 40. According to the data corresponding to the preceding frame or field of the video signal, the predictor generates a prediction signal which is fed back to the converter 10 which, according to known techniques, each time chooses the most favorable block.

EXAMPLE

Figure 5:
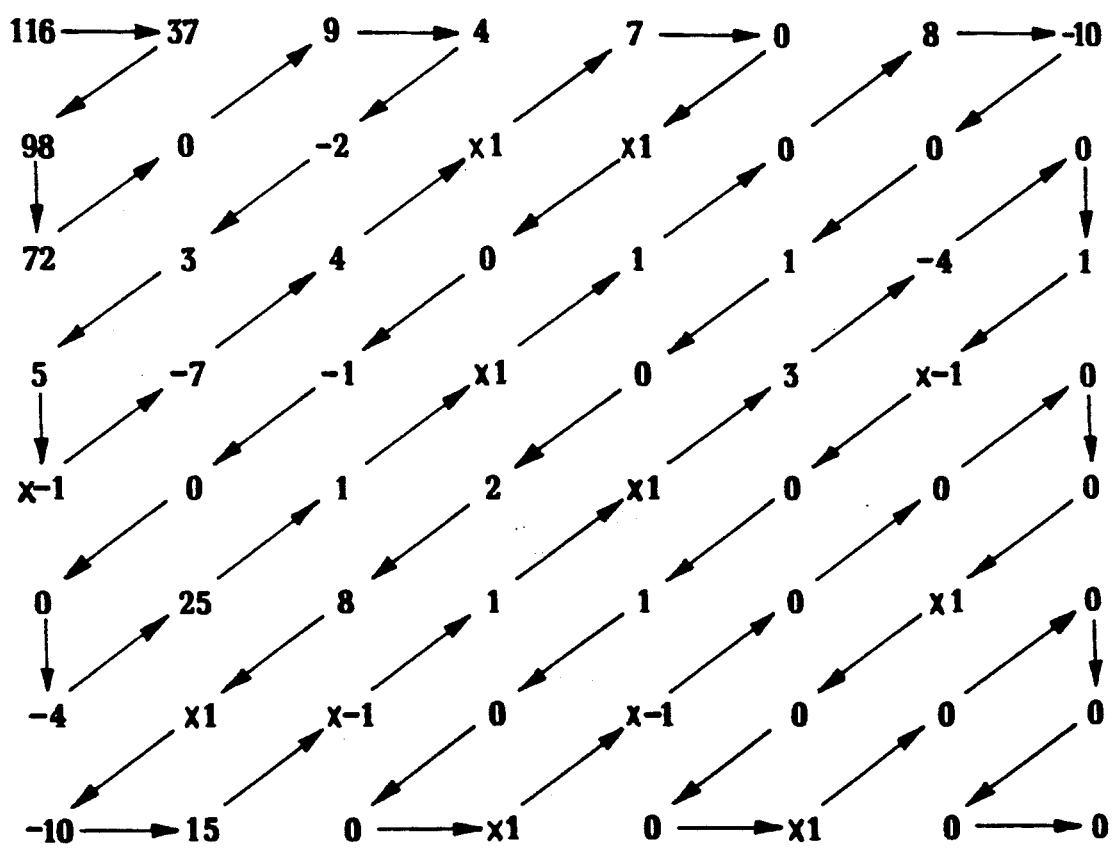
FIG. 5 is an example of a block signal at the output of the quantizer.

A quantized block SQ as shown in FIG. 5 is applied to the processor following the scanning sequence shown by the arrows.

After the scanning the following VSC vector is obtained:

```
116 37 98 72 0 9 4 −2 3 5 x − 1 −7 4 x 1 7 0 x 1 0 −1 0 0 −4 25 1
x 1 1 0 8 −10 0 1 0 2 8 x 1 − 10 15 x − 1 1 x 1 3 −4 0 1 x − 1 0 1 0
0 x 1 x − 1 0 0 0 0 x 1 0 0 x 1 0 0 0 0 0.
```

Going in the decision module 36, vector VSC becomes:

```
116 37 98 72 0 9 4 −2 3 5 −1 −7 4 1 7 0 0 0 −1 0 0 −4 25 1 1
1 0 8 −10 0 1 0 2 8 1 −10 15 −1 1 1 3 −4 0 1 0 0 1 0 0 0 0 0
0 0 0 0 0 0 0 0 0 0,
``` and, eventually, after processing in the zero forming module, signal SP is obtained, which will be applied to the VLC encoder:

```
116 37 98 72 Z1 9 4 −2 3 5 −1 −7 4 1 7 Z3 −1 Z2 −4 25 1 1 1
Z1 8 −10 Z1 1 Z1 2 8 1 −10 15 −1 1 1 3 −4 Z1 1 Z2 1 EOB.
```

In the above described device, a considerable saving of bits is obtained in the signal applied to the buffer, with a slight worsening of the signal-to-quantization noise ratio. However, since the quantization resolution is adaptive, and increases as the load on the buffer is reduced, on the average the quantizer will operate at greater resolution levels because of the bit saving, and the average quality of the transmitted image will be greater.

Although choosing $k=1$ means incorporating in the range of the ambiguous level the whole interval corresponding to the output level 1 of the conventional quantizer, surprisingly it has been found that in most cases the resulting image is better than that obtained without using the invention, due to the effect of indirect reduction of the quantization noise due to the reduced load on the buffer and to the consequent feedback on the quantization resolution.

According to a different embodiment of the invention, the uncertainty range, within which the quantizer generates the ambiguous level $x1$, may extend even below the input level 0.5, i.e. between $0.5-h$ and $0.5+k$, k being as defined above and h being variable between 0 and 0.2, preferably 0.1. Considering that encoding an isolated zero requires four bits (see Table I), while encoding a 1 requires just two bits, it can be seen how such widening of the ambiguous level range brings about a further saving in the VLC encoding. Naturally, for the $x-1$ level the same parameters are valid with inverted signs.

Choosing the optimal values for the parameters h and k is not critical insofar as a reasonable range is maintained, and it can be done only empirically, on the basis of a statistical evaluation of the bit rate reduction for the same quality of reconstructed image.

Figure 4:
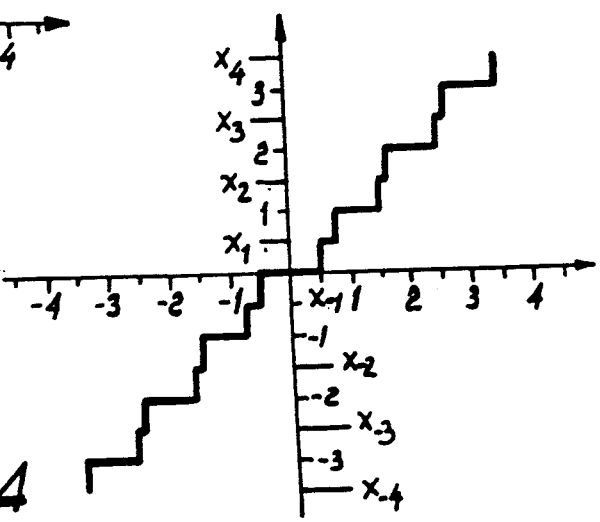
FIG. 4 is a graph similar to that of FIG. 2, for a different embodiment of the invention.

According to another embodiment, it is predictable that, beside generating ambiguous levels $x1$ on the threshold between level 0 and level 1, the quantizer can generate ambiguous levels $x2$, $x3$, even on other thresholds, for example between level 1 and level 2, level 2 and level 3, etc., as illustrated in FIG. 4 by way of example. Such ambiguous levels are subsequently determined by the decision module in order to provide the lower number of bits in the generated variable length word. This too helps in reducing the load on the buffer, with final effects similar to those described above.

The invention can be used together with other techniques for reducing the redundancy of the signal.

It is also apparent that the processor adapted to execute the decision function in determining the ambiguous levels, may be constructed differently from what has been described above, for example by joining in one treatment the above mentioned decision, scanning and forming of symbols of zero sequences and of block ends.

Some of the preferred embodiments of the invention have been described but, naturally, to a man skilled in the art, many modifications and variations are within the scope of the invention.

What is claimed is:

1. An improved device for DCT encoding, quantization and variable-word-length encoding of digital video signals with a reduction of redundancy of the video signal, comprising a converter which processes a digital video signal according to a redundancy-reducing algorithm operating on successive blocks of each frame or field and generates a transformed signal which is applied to a quantizer adapted to generate a quantized signal at preset transition levels on opposite sides of zero, including the zero ($\ldots, -3, -2, 0, 1, 2, 3, \ldots$), which is processed by a processor, adapted to determine the block length and the consecutive zero sequences along a preset scanning order, and adapted to output a symbolic signal, constituted by symbols designating the quantization levels of the non-null data, the zero sequences and a symbol designating the end of the block, the symbolic signal being applied to a variable-length encoder, adapted to encode data according to a preset assignment rule for generating a signal which is applied to a transmission buffer; said quantized signal generated by the quantizer further comprising two ambiguous levels ($x1$ and $x-1$) at input values comprised in respective preset intermediate ranges respectively between the zero level and the first positive level and between the zero level and the first negative level, said processor transforming each of said ambiguous levels respectively into a first positive level and a first negative level if the preceding and subsequent input values are both non-null and non-ambiguous levels, and transforms the ambiguous level into zero level in all the other cases.

2. Device, according to claim 1, wherein said ambiguous levels $x1$ and $x-1$ are generated by the quantizer for input values falling respectively within the range between $+0.5$ and $(0.5+k)$ and within the range between $-(0.5+k)$ and $-0.5$, k being comprised between 0 and 1 times the interval between the first and second quantization level.

3. Device, according to claim 2, wherein said ambiguous levels $x1$ and $x-1$ are generated by the quantizer also for input values falling respectively within the range between $(0.5-h)$ and $+0.5$ and within the range between $-0.5$ and $-(0.5-h)$, h being comprised between 0 and 0.3 times the interval between the zero quantization level and the first quantization level.

4. A digital video signal compression device comprising:
converter means for processing an incoming digital video signal according to a redundancy-reducing algorithm operating on successive blocks of each frame or field to generate a transformed signal;

quantizer means operatively connected to said converter means for generating from said transformed signal a quantized signal at preset transition levels including zero and discrete transition levels on opposite sides of zero and further including a first ambiguous level at input values falling into a first preset intermediate range between zero and a preselected positive level and a second ambiguous level at input values falling into a second preset intermediate range between zero and a preselected negative level;

processing means operatively connected to said quantizer means for determining block lengths and consecutive zero sequences along a preselected scanning order in said quantized signal, for generating a symbolic signal comprising symbols designating quantization levels of non-zero data, zero sequences and ends of blocks in said quantized signal, and for transforming said first ambiguous level and said second ambiguous level into a first positive level and a first negative level, respectively, if input values immediately preceding and succeeding an instance of one of said first ambiguous level and said second ambiguous level are both non-zero and non-ambiguous levels and for transforming said first ambiguous level and said second ambiguous level into zero in all other cases;

variable-length encoder means operatively connected to said processing means for generating an encoded signal encoding data in said symbolic signal according to a predetermined assignment rule; and a transmission buffer operatively connected to said encoder means for receiving and temporarily storing said encoded signal.

5. The device according to claim 4 wherein said first ambiguous level is generated by said quantizer means for input values falling between $+0.5$ and $(0.5+k)$ and wherein said second ambiguous level is generated by said quantizer means for input values falling between $-(0.5+k)$ and $-0.5$, where k is between 0 and 1 times an interval between said first positive level and a second positive level.

6. The device according to claim 5 wherein said first ambiguous level is also generated by said quantizer means for input values falling between $+0.5-h$ and $+0.5$ and wherein said second ambiguous level is also generated by said quantizer means for input values falling between $-0.5$ and $-(0.5-h)$, where h is between 0 and 0.3 times an interval between the zero quantization level and said first positive level.

* * * * *

UNITED STATES PATENT AND TRADEMARK OFFICE
CERTIFICATE OF CORRECTION

PATENT NO. : 5,006,930
DATED : April 9, 1991
INVENTOR(S) : Mario Stroppiana et al.

It is certified that error appears in the above-identified patent and that said Letters Patent is hereby corrected as shown below:

On the title page, the correct name of the Assignee
is: --RAI Radiotelevisione Italiana S.p.A.--.

Signed and Sealed this

Eighth Day of February, 1994

*Attest:*

BRUCE LEHMAN

*Attesting Officer*     *Commissioner of Patents and Trademarks*